United States Patent [19]

Randin

[11] 4,312,929

[45] Jan. 26, 1982

[54] POLYMERIC ELECTROLYTE FOR ELECTRO-OPTICAL DEVICE

[75] Inventor: Jean-Paul Randin, Cortaillod, Switzerland

[73] Assignee: Ebauches S.A., Neuchatel, Switzerland

[21] Appl. No.: 136,467

[22] Filed: Apr. 2, 1980

[30] Foreign Application Priority Data

May 3, 1979 [CH] Switzerland ............ 4132/79

[51] Int. Cl.³ ............................ H01M 6/04
[52] U.S. Cl. ............................ 429/188; 252/62.2
[58] Field of Search ............ 429/190, 198, 188, 192; 350/356, 357; 252/62.2

[56] References Cited

U.S. PATENT DOCUMENTS

| | | | |
|---|---|---|---|
| 3,481,785 | 12/1969 | Ikari | 429/198 |
| 3,575,728 | 4/1971 | Ito | 429/198 X |
| 3,644,150 | 2/1972 | Oomen et al. | 429/198 X |
| 3,793,079 | 2/1974 | Brown et al. | 429/198 X |
| 4,115,545 | 9/1978 | Reddy | 350/357 |
| 4,116,546 | 9/1978 | Leibowitz | 350/357 |

*Primary Examiner*—Charles F. LeFevour
*Attorney, Agent, or Firm*—Young & Thompson

[57] ABSTRACT

This invention relates to a polymeric electrolyte for an electro-optical device including an electrode provided with an electrochromic layer and a counter electrode which comprises a mixture of a protonic polymer and water in which the product of the water content and the gram equivalent weight of polymer is equal to or less than the product of the molecular weight of water and the number n of water molecules bonded per anion group of each monomer of the polymer, the number n being 6 in the case of a sulphonic polymer.

The electrolyte, which may be used, e.g. in a display cell including an electrode provided with an electrochromic layer, for example $WO_3$, and a counter electrode, is inert relative to the electrochromic layer.

5 Claims, No Drawings

POLYMERIC ELECTROLYTE FOR ELECTRO-OPTICAL DEVICE

The invention relates to the preparation of a polymeric electrolyte for providing the ionic conduction between an electrode and a counter electrode in an electrooptical device, particularly an electrochromic display cell.

It is generally accepted that an electrolyte of this type must have certain properties if it is to be used satisfactorily in an electrochromic display cell of the type described particularly in U.S. Pat. No. 4,116,546, where there is an electrochromic layer on both the electrode and the counter electrode, or in Swiss Pat. No. 594,263, where no electrochromic layer is used on the counter electrode. These display cells use an oxide of a transition metal, such as tungsten trioxide ($WO_3$), as the electrochromic layer. The electrode known as the display electrode is in the form of conductive segments which can be selectively controlled to display, for example, symbols, numbers or letters. The electrolyte must be a good ionic conductor but with low electronic conductivity, must be chemically and electro-chemically stable, and must be compatible with the materials making up the electrode and counter electrode. More particularly, it must be inert relative to the electrochromic layer, must be pigmentable in order to form a diffusing opaque background that will contrast with the electrochromic layer and conceal the counter electrode, and must have a consistency appropriate to give uniform physical contact with both the electrode and the counter electrode.

The electrolyte used in the first known electrochromic devices generally consisted of concentrated sulphuric acid or other acids in liquid or gel form, e.g. mixed with glycerin; this had serious disadvantages due to the gradual dissolution by the electrolyte of the electrochromic layer of $WO_3$. In addition, the use of a liquid electrolyte often created problems of sealing the electrochromic cell. The use of aprotic solvents with e.g. lithium perchlorate dissolved in them creates great technological difficulties during the preparation of the electrolyte and the formation of the cell.

An important improvement in the properties of these electrolytes has been provided with the use of ionic polymers, as described in the abovementioned Swiss Pat. No. 594,263. The polymers are in solid or paste form and are preferably of the type which can be used as ion exchangers such as polystyrene sulphonic acid, polyacrylic acid, polymethacrylic acid and phenolsulphonic acid. Polymers that have subsequently been recommended by other authors for use as the electrolyte are a perfluorosulphonic acid resin, described particularly in French Pat. No. 2,274,940 and U.S. Pat. No. 4,116,546, or a polyethylene sulphonic acid as disclosed in U.S. Pat. No. 4,116,545.

These protonic polymeric electrolytes have indeed helped to remedy some of the disadvantages of electrolytes used in the past. The fact remains, however, that although the presence of water is indispensable to ionic dissociation, e.g. of the $-SO_3^-H^+$ group in the case of sulphonic polymers, it is fairly troublesome, particularly in connection with the dissolution of the electrochromic layer, which generally consists of tungsten trioxide or a simple or mixed oxide of another transition metal. On the other hand, since the ionic conductivity of the electrolyte increases when the quantity of water increases (see C. S. Fadley and R. A. Wallace, J. Electrochem. Soc. 115, p. 1264–1270, 1968), the relative water content of the electrolyte would appear to be an essential parameter in defining an electrolyte with optimum properties.

The quantity of water in the protonic electrolyte is also involved in determining the physical consistency of the electrolyte relative to the gram equivalent weight of polymer, and this consistency is one of the important parameters in defining optimum conditions.

After studying prior art, it appears to use that the above parameters, which are important in providing an optimum formulation for the electrolyte, have never yet been precisely defined. Only U.S. Pat. No. 4,116,546 mentions that the polymeric separating electrolyte has to be "wetted chemically" with water or a dilute acid, while the water content of the electrolyte, which consists of a polyethylenesulphonic acid resin, is simply mentioned in the two special examples described in U.S. Pat. No. 4,116,545.

The invention is based on experiments leading to the unexpected discovery that the maximum water content required to make the electrolyte inert relative to the electrochromic layer corresponds to the product of a constant and the reciprocal of the gram equivalent weight of polymer; this constant applies to a specific type of protonic polymer and a specific type of electrochromic material.

This relationship between the two fundamental parameters determining the properties of the electrolyte conversely enables an appropriate polymer to be defined by its equivalent weight: thus it is known that the electrolyte must contain a certain previously stipulated quantity of water that will not cause the electrochromic layer to dissolve, but on the other hand, it is easier to make a satisfactory electrochromic cell with a mixture containing a relatively high quantity of water (30 to 40%) than with a mixture which may only contain e.g. less than 10%. It has also been observed experimentally that the kinetics of cells made with a polymer-water mixture containing only a small quantity of water are very slow.

The notion of the kinetics of the cell corresponds to the time required for the electrochromic layer of the display electrode to reach an adequate given contrast by the action of a given applied potential, with the diffusing background formed by a pigment dispersed in the electrolyte. This required time, or "response time of the cell", varies with the conductivity of the electrolyte, all other parameters remaining constant. The conductivity of an electrolyte consisting of polymer and water varies, firstly as an absolute value according to the gram equivalent weight and nature of the acid group in the selected protonic polymer and secondly for a given polymer, with the water content of the electrolyte. It is thus important to be able to determine a maximum water content for a given polymer that will enable higher kinetics to be obtained, but without the danger of shortening the life of the cell because of dissolution of the electrochromic layer.

This demonstrates that, although the critical concentration of water, i.e. that at which the kinetics are sufficiently rapid and the speed of dissolution of the electrochromic layer is negligible, varies widely from one polymer to another, there is indeed a relationship between this critical concentration of water and the equivalent weight of the polymer; this relationship is a function of the number n of water molecules bonded per anion group of each monomer of the polymer in question.

The present invention provides a polymeric electrolyte for an electro-optical device including an electrode provided with an electrochromic layer and a counter electrode, that comprises a mixture of a protonic polymer and water in which the product of the water content (percent by weight) and the gram equivalent weight of the polymer is less than or equal to the product of the molecular weight of the water and the number n of water molecules bonded per anion of each monomer of the said polymer. Electrolytes used in accordance with the present invention have been found to be stable, inert relative to the electrochromic materials and more particularly to oxides of transition metals, to have an appropriate physical consistency to provide good contact between the electrode and the counter electrode, and to give the electro-optical device the fastest possible kinetics.

Ions in solution are known to have around them a certain number of molecules of solvent arranged in a so-called solvation sphere. In the case of sulphonic polymeric electrolytes, for example, a certain number of water molecules are bonded into the hydration sphere of the ions of the group $-SO_3^- H^+$ to a greater or less degree. The number of bonded water molecules present in the hydration sphere of each monomer making up the protonic polymer naturally depends on the nature of the ionic group, the number of such groups per monomer and the medium in question.

To determine the number of water molecules, the fusion energy can, for example, be measured by differential thermal analysis (DTA); the thermal energy decreases when the quantity of water present in the electrolyte is reduced, and the temperature corresponding to the peak of the DTA also decreases. Then the fusion energy $\Delta H$ expressed as kilojoules per mole of "dry" polymer is plotted on a graph, as a function of the quantity of water in the polymer, expressed by n, which corresponds to the number of moles of water per mole of "dry" polymer or, in a sulphonic polymer containing one $SO_3^-$ group per monomer, the number of moles of water divided by the number of moles of $SO_3^-$. The graphic representation of $\Delta H = f(n)$ is a straight line intersecting the axis of n at a value at which the water is completely bonded since the fusion enthalpy is zero.

As an example, the value n at which $\Delta H = 0$ was determined in the case of four different sulphonic polymers. It appeared from the experimental values that, allowing for the experimental margin of error, the number n was always between 6 and 7. It can consequently be accepted that there are about 6 moles of water bonded to each mole of $SO_3^-$. This lower value will of course be retained, since a maximum value for the water content is sought above which the free water present might sooner or later lead to the dissolution of the electrochromic layer and therefore to unacceptable shortening of the life of the electrochromic cell.

From the points made above the following relationship can thus be established between the gram equivalent weight of polymer, the number of water molecules bonded per anionic group of each monomer, and the maximum acceptable percentage of water to keep the electrolyte inert relative to an electrochemical layer:

$$\% \text{ H}_2\text{O max} = n \cdot \frac{\text{molecular weight of water}}{\text{equivalent weight of polymer}} \cdot 100$$

where the % $H_2O$ max is given relative to the "dry" polymer; n is as previously defined; and the molecular weight of water is 18.

In the case of sulphonic polymers, i.e. where n=6 as seen previously, the equation becomes:

$$\% \text{ H}_2\text{O max} = \frac{10800}{\text{gram equivalent weight of polymer}}$$

and the following table can thus be obtained. It relates to the four sulphonic polymers selected by way of example and indicates the maximum water content, as a percentage of the "dry" polymer, that is acceptable in order to avoid any dissolution of the electrochromic material, more particularly $WO_3$.

TABLE

| Polymer | Gram equivalent weight of polymer | Maximum content of $H_2O$ (% $H_2O$ max.) |
|---|---|---|
| Polyethylene sulphonic acid | 108 | 100 |
| Polystyrene sulphonic acid | 184 | 59 |
| Poly[2-acrylamido-2-methyl-propanesulphonic acid] | 207 | 52 |
| Perfluoro sulphonic acid (sold under trade mark Nafion) | 1100 1500 | 10 7.2 |

Other factors naturally have to be considered when selecting the water content, particularly the fact that a high water content, although favourable to the kinetics of the cell, may also have disadvantages such as excessive fluidity of the electrolyte, which may e.g. raise sealing problems. This is particularly the case with polystyrene sulphonic acid: here a value of 59% of water would be acceptable without any risk of the electrochromic layer dissolving, but in practice this percentage is too high; in this case it is appropriate to use about 40% of water of "dry" polymer in order to prevent the electrolyte from becoming too fluid.

The above-mentioned equation may of course also be used to determine the appropriate gram equivalent weight of the polymer, should one wish to start from a previously defined water content for special reasons. The equation then becomes, still in the case of sulphonic polymers:

$$\text{Gram Equivalent weight of polymer} = \frac{10800}{\% \text{ H}_2\text{O max}}$$

As an example, if one chooses to work with a water content of less than 30%, application of the above equation will lead to the use of a sulphonic polymer with a gram equivalent weight below 360.

As a further explanation of the invention and its application, the following illustrative examples describe the preparation of three different polymeric electrolytes and the formation of electrochromic display cells containing these electrolytes.

EXAMPLE 1

A transparent conductive layer of $SnO_2$ is applied to glass slide, and an electrochromic layer of $WO_3$ is deposited on the conductive layer. The electrochromic layer may be given the shape of a number, letter or any other symbol, so that it forms the display electrode.

The counter electrode is formed by an electrochromic layer of $WO_3$ that has previously been cathodically polarised in a 10% solution of $H_2SO_4$. The counter electrode, which is highly coloured, is washed and dried before being used in the cell. In a modified embodiment the counter electrode may be formed by a sheet of paper graphite prepared from polymeric fibres and carbon by techniques known in the field of fuel cells.

The electrolyte that is to provide the ionic conduction between the two electrodes of the cell is prepared separately. The sodium salt of polystyrene sulphonic acid (ICN Pharmaceuticals, Inc., New York), with an equivalent weight of 184, is dissolved in demineralised water (about 10 g/liter) and the solution is passed over a cation exchange resin such as that sold under the trade mark "Amberlite IR 120". Approximately 5 to 10% by weight, relative to the dry polymer, of a white pigment based on $TiO_2$ is then added to the resultant solution. Finally, enough water is evaporated to give a paste containing about 30% by weight of water, still relative to the weight of dry polymer. If the Table above is referred to, it will be seen that this value is about half that which could have been used without any danger of dissolving the electrochromic layer of the cell; in fact the maximum quantity of water cannot be used in this case, since the electrolyte becomes too fluid above 30%.

The pigmented paste obtained above is then applied as electrolyte to the counter electrode, then the display electrode is applied to the layer of electrolyte in paste form, with the electrochromic layer of $WO_3$ in contact with the said electrolyte. The resultant assembly is appropriately sealed to form an electrochromic display cell.

EXAMPLE 2

In the formation of a different electrochromic display cell the same procedure as that described in Example 1 is followed, except for the preparation of the polymeric electrolyte. This is obtained as follows.

A membrane of perfluorosulphonic acid with an equivalent weight of 1100 or 1500 respectively and containing an appropriate pigment, is treated with dilute nitric acid to ensure that all the sulphonic groups are well neutralised by a proton. The membrane is then conditioned for 30 minutes in deionised boiling water and finally equilibrated for at least 24 hours in an atmosphere with a relative humidity of 80%, to give an electrolyte with a water content of not over 7% or not over 10% respectively.

EXAMPLE 3

In this example poly[2-acrylamido-2-methyl-propanesulphonic acid] is used as the polymer for the preparation of the electrolyte. Its equivalent weight is 207 and it also contains enough pigment to form a diffusing background. The aqueous solution of this polymer, which may be obtained as disclosed in the specification of Swiss patent application Ser. No. 4133/79 of May 3, 1979, is applied directly to the counter electrode or to the display electrode, after which the water is allowed to evaporate to a paste-like consistency. The electrode with the electrolyte is then placed in an atmosphere with a relative humidity of 70-80% for at least 24 hours, in order to equilibrate the electrolyte and make it contain about 50% by weight of water relative to the weight of dry polymer. The other electrode is applied to the paste-like electrolyte thus formed and the cell is appropriately sealed.

The electrochromic display cells made in accordance with Examples 1 to 3 above then underwent cyclic tests at 0.5 Hz and room temperature. The current applied during the colouring period was 5 mA/cm² for 1.0 seconds and during the period of bleaching was 5.3 mA/cm² for 1.0 seconds. No dissolution of the electrochromic layer of $WO_3$ was observed after 5 million cycles, and the other properties, such as contrast between the electrochromic layer and the diffusing background and maximum potential achieved during colouring, were found excellent with a view to practical use in these cells. On the other hand if the quantity of water in the electrolyte slightly exceeded the limits defined by the invention, a grey contrast between the electrochromic layer and the diffusing background would appear rapidly. Finally, if the quantity of water much exceeded these limits, yellow colouring of the electrochromic layer would appear and rapid dissolution of the electrochromic layer of $WO_3$ would be observed.

Thus the protonic polymeric electrolyte according to the invention, which is designed for use in an electro-optical device and more particularly in an electrochromic display cell to provide the ionic conduction between the display electrode and the oppositing electrode, has the advantage over known electrolytes of the same type of being always perfectly inert relative to the electrochromic layer, which is generally made of $WO_3$ or a simple or mixed oxide of other transition metals, and of having an appropriate physical consistency to provide optimum contact with the electrode and counter electrode. This results from the fact that its maximum water content is defined precisely to give rapid kinetics of the cell without any danger of the electrochromic layer dissolving and is related to the equivalent weight of the selected polymer.

While the invention has been described in detail and with reference to specific embodiments thereof, it will be apparent to one skilled in the art that various changes and modifications can be made therein without departing from the spirit and scope thereof.

What I claim is:

1. A polymeric electrolyte for an electrooptical device including an electrode provided with an electrochromic layer and a counter electrode, that comprises a mixture of a sulphonic protonic polymer and water in which the weight percent of water is equal to or not much less than 10800 divided by the gram equivalent weight of the polymer.

2. An electrolyte as claimed in claim 1, that comprises a mixture of polyethylene sulphonic acid and water, the water content as a percentage of the dry polymer being equal to or not substantially less than 100%.

3. An electrolyte as claimed in claim 1, that comprises a mixture of polystyrene sulphonic acid and water, the water content as a percentage of the dry polymer being equal to or not substantially less than 59%.

4. An electrolyte as claimed in claim 1, that comprises a mixture of poly-2-acrylamido-2-methyl-propanesulphonic acid and water, the water content as a percentage of the dry polymer being equal to or not substantially less than 52%.

5. An electrolyte as claimed in claim 1 that comprises a mixture of perfluorosulphonic acid with equivalent weight of 1100 or 1500 and water, the water content as a percentage of the dry polymer being equal to or not substantially less than 10% or 7.2%, respectively.

* * * * *